(12) United States Patent
Vanwey et al.

(10) Patent No.: US 8,998,160 B1
(45) Date of Patent: Apr. 7, 2015

(54) CONVEYOR SUPPORT FRAME METHOD AND APPARATUS

(71) Applicants: Timothy Vanwey, Sesser, IL (US); Grant Wilson, West Frankfort, IL (US)

(72) Inventors: Timothy Vanwey, Sesser, IL (US); Grant Wilson, West Frankfort, IL (US)

(73) Assignee: Jolt LLC, Sesser, IL (US)

( * ) Notice: Subject to any disclaimer, the term of this patent is extended or adjusted under 35 U.S.C. 154(b) by 353 days.

(21) Appl. No.: 13/573,650

(22) Filed: Oct. 1, 2012

(51) Int. Cl.
*A47F 5/00* (2006.01)
*B65G 41/00* (2006.01)

(52) U.S. Cl.
CPC ....................................... *B65G 41/00* (2013.01)

(58) Field of Classification Search
USPC ........... 248/688, 677, 351, 352, 354.1, 354.5, 248/357, 507; 5/162, 168, 310
See application file for complete search history.

(56) References Cited

U.S. PATENT DOCUMENTS

| | | | |
|---|---|---|---|
| 2,597,634 A | | 5/1952 | Grevich |
| 3,146,002 A | * | 8/1964 | Faber .......................... 280/763.1 |
| 3,360,282 A | | 12/1967 | Dugan |
| 3,713,259 A | * | 1/1973 | Tkach ............................. 52/111 |
| 4,520,649 A | | 6/1985 | Barton, Sr. |
| 4,993,677 A | * | 2/1991 | Patterson ....................... 248/351 |
| 5,231,713 A | * | 8/1993 | McDonnell ....................... 5/310 |
| 5,372,287 A | * | 12/1994 | Deguevara ..................... 224/510 |
| 5,477,571 A | * | 12/1995 | Roggenkamp et al. ........... 5/310 |
| 5,490,656 A | * | 2/1996 | Frisby ............................ 248/352 |
| 6,019,337 A | * | 2/2000 | Brown ........................ 248/354.5 |
| 6,505,764 B2 | * | 1/2003 | Vining et al. .................. 224/405 |
| 7,621,356 B2 | | 11/2009 | Quarberg |
| 2003/0000812 A1 | | 1/2003 | McTaggart et al. |
| 2004/0182982 A1 | * | 9/2004 | Auman ....................... 248/354.1 |
| 2009/0277753 A1 | | 11/2009 | Violle |
| 2009/0283653 A1 | * | 11/2009 | Zhang ........................... 248/352 |
| 2010/0096529 A1 | | 4/2010 | Kritsky |
| 2011/0017573 A1 | | 1/2011 | Karpy |

\* cited by examiner

*Primary Examiner* — Bradley Duckworth
(74) *Attorney, Agent, or Firm* — John M. Adams; Price & Adams

(57) ABSTRACT

A L-shaped bracket having aligned vertical and horizontal slots is mounted on a telescopic stand. A frame member is positioned on a horizontal support plate of the bracket. A bearing plate extends vertically from the support plate. The support plate includes spaced apart open ended slots aligned beneath elongated vertically extending slots in the bearing plate. A J-bolt having a cap at one end and a threaded portion at an opposite end extends through the aligned slots to a position where the cap abuts the bearing plate and the threaded end portion extends down through the slot in the support plate. A bell nut is tightened on the threaded end of the bolt to draw the bolt into clamping engagement with the frame where the bolt is adjustable along the length of the vertical slot in the bearing plate to receive frames of a variable range of height.

10 Claims, 7 Drawing Sheets

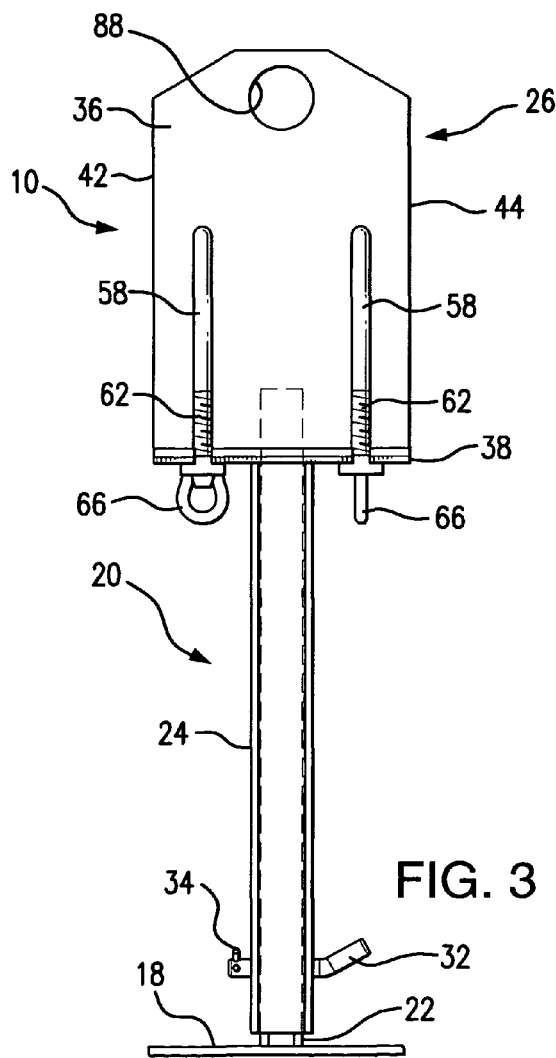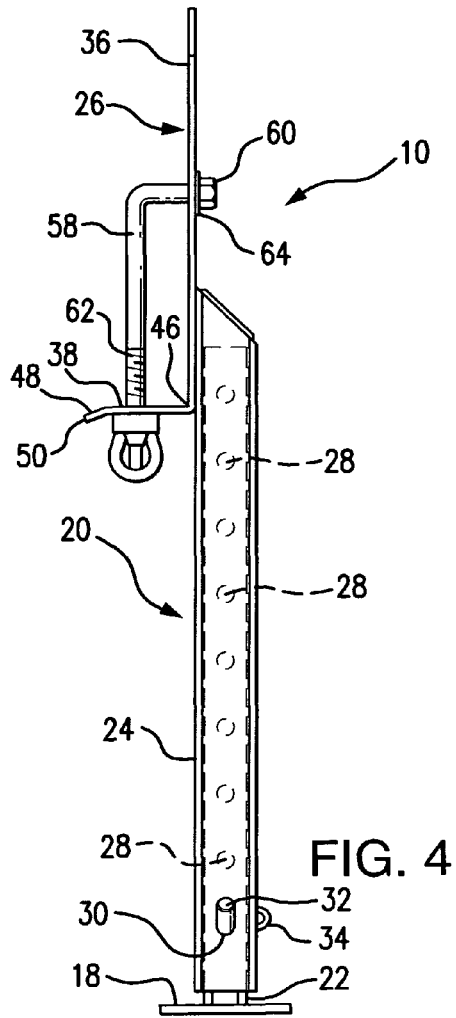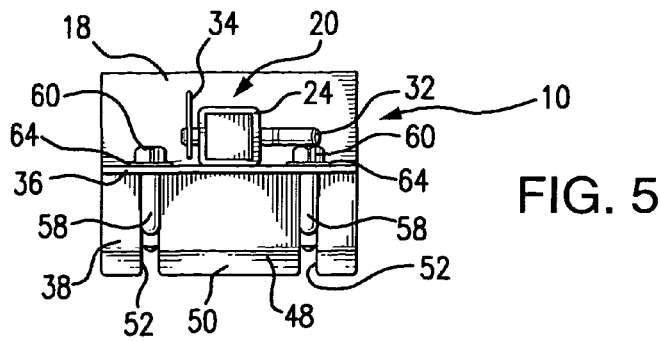

CONVEYOR SUPPORT FRAME METHOD AND APPARATUS

BACKGROUND OF THE INVENTION

1. Field of the Invention

The present invention relates to method and apparatus for supporting a frame member and, more particularly, to a stand, jack and the like for supporting a frame, I-beam and specifically the frame of a conveyor at a preselected height above a foundation.

2. Description of the Prior Art

It is a well known practice to support load bearing frames, beams, cables and the like by vertically adjustable stands or jacks that include brackets positioned on vertically adjustable support members for receiving the load bearing frame, beam member, or cable. A load bearing bracket is secured by welding and the like to the upper end of a telescopic arrangement of tubes or supports that are connected at a lower end to a base positioned on a foundation. The stand or bracket is vertically movable to a preselected height above the foundation to receive the structure to be supported.

In one application, the bracket includes a bearing surface that supports the frame. In scaffolding applications a series of jacks or stands are spaced apart to support the load bearing members. The same arrangement is used to support any machine component that is built upon a foundation where the frame of the machinery must be adjustable vertically so that the components are in alignment and level.

Stands, vertical supports, and jacks are conventionally used to support conveyor systems where the system is composed of a frame assembled in component parts. Each component extends a preselected length and is connected end to end. The conveyor frame conventionally includes spaced apart and parallel rails or wire rope cables and other frame structures. Typically, the frame members are I-beams that support conveyor rollers around which a conveyor belt is positioned. In another arrangement the conveyor frame members include a pair of parallel wire ropes or cables to which the conveyor rollers are attached. A drive end of the conveyor advances the belt over the surface of the rollers. The I-beams, cables, or rails maintain the position of the belt centered on the rollers.

Where the conveyor systems extends over a considerable distance in a manufacturing operation the foundation upon which the conveyor is constructed may vary in elevation due to undulations in the foundation or distances through which the conveyor passes. Therefore, to maintain the conveyor belt substantially level over the distance the conveyor runs, it is necessary to adjust the elevation of the conveyor sections to accommodate undulations in the elevation of the foundation.

One approach to supporting a conveyor frame is to custom design the vertical supports or jacks for a length that supports the conveyor frame at a preselected height. This is a time consuming and expense operation. As an alternative, it is known to utilize conveyor stands or jacks that are vertically adjustable in a telescopic configuration. Once the height of the conveyor stand is determined for support of the conveyor frame, the stand is connected to the conveyor frame to securely position the conveyor frame on the stand. Conventionally, this requires drilling aligned bolt holes through the conveyor stand and the frame. Then fastening members are extended through the aligned holes and secured in place. This is a difficult task in work areas where the foundation varies in elevation below the conveyor frame.

Conveyor systems are conventionally used in underground mining operations for the conveyance of dislodged material from a mine face to a haulage area where the dislodged mine material is transported out of the mine. The conveyor systems are positioned in mine passageways where conveyor frames formed of I-beams, rails, or wire rope cables are supported by stands or jacks. Because the mine floor which supports the conveyor frame is undulating, the conveyor stands must be custom cut to maintain the conveyor surface in a substantially level position.

The conveyor support stands are custom cut at a preselected length to support the conveyor frame so that the adjacent conveyor sections are level to assure that the movement of the mined material on the conveyor remains continuous and is not interrupted by misalignment of adjacent conveyor sections. Therefore it is important that the conveyor frame be supported to maintain a level conveying surface.

It is well known to support frame members of loading bearing members on jacks or stands that include brackets that are clamped to frame members or beams which support the load. U.S. Patent Application Pub. No. U.S. 2003/0000812 discloses a modular roller conveyor system that includes a pair of elongated vertical supports that receive horizontal rails. A plurality of roller assemblies are positioned between and supported by the rails. The roller assemblies define the conveyor path for the conveyor system. Vertical supports include a square tube that is adjustable in height by the provision of a threaded shaft. A bracket is secured to the upper end of the tube and includes holes adapted to register with mounting holes in side rails. The aligned holes receive threaded members to secure them together.

U.S. Patent Application Pub. No. 2011/0017573 discloses a conveyor constructed to be assembled and disassembled without the need for tools or additional fasteners for the components. The frame includes a series of legs that support the conveyor. Each leg has a foot which is vertically adjustable by a threaded shaft that engages an opening in the leg. By rotating the foot of the shaft in a desired direction, the height of the leg and thus the height of the conveyor is adjusted. The feet are also adjusted to account for discrepancies in the levelness of the floor. In this manner, the top of the conveyor is maintained level. The legs forming the frame support a plurality of mounting brackets that are in turn connected to supports in the form of bars or rods. Each bracket includes slots adapted to receive rails that support a conveyor belt.

U.S. Patent Application Pub. No. U.S. 2009/0277753 discloses a system for linking a number of conveyor modules to form a route for transporting individual items associated with merchandising, such as parcels, tubes, boxes, bundles and the like that would be encountered in moving the items in various directions and elevations in a warehouse, sorting center, warehouse terminal, and the like. Each module includes a frame adjustable in height and inclination by provision of a system of retractable telescopic bipods. The bipods are retractable for raising and lowering the conveyor modules to maintain them in a level position. The modules are also angularly adjustable. The length of each of the bipods can be adjusted to allow the modules to be selectively positioned at a given height and in an angular position.

U.S. Patent Application Pub. No. U.S. 2010/0096529 discloses a stand for supporting a window sash while in a window frame when the window sash is tilted-in relative to the window frame. The stand includes a base, an upright, and a supporter. The base rests on a horizontal surface adjacent to the window frame. The upright extends vertically from the base to an upper end. The support extends transversely across the upper end of the upright for supporting the window sash. The upright is height-adjustable by being telescopic by the provision of an outer tube and an inner tube. The inner tube is maintained at a preselected height within the outer tube by a spring-loaded push-button cooperating with a plurality of bores in the outer tube of the upright.

U.S. Pat. No. 7,621,356 discloses a trailer jack for elevating and lowering a trailer tongue and having a caster wheel assembly affixed to a lower end of the jack. A jackscrew assembly includes an outer tubular housing and an inner tubular cylinder. The cylinder surrounds a concentrically disposed elongated screw. A nut positioned on the threads of the screw is welded or swaged to the inside diameter of the tubular member. Rotation of the crank produces longitudinal displacement of the outer tubular housing with respect to the inner tubular member. The trailer jack assembly is clamped to a trailer tongue by a pair of U-bolts that fit around the tongue and are secured by bolts. Rotation of a crank raises or lowers a coupler on the end of the tongue relative to a hitch ball on a towing vehicle. With this arrangement the trailer jack assembly is used to raise or lower the trailer tongue relative to the height of the hitch ball on the towing vehicle.

U.S. Pat. No. 3,360,282 discloses a wheeled trailer tongue support for maintaining a trailer tongue of a two-wheel trailer in a horizontal position when the trailer is parked. A trailer tongue projects forwardly of a boat supporting frame. A wheel assembly is pivotally connected by a lever arm to one side of the trailer tongue. A bracket connects the lever to the trailer tongue. The bracket includes a right angle portion having a leg portion that overlies the trailer tongue. A depending leg contacts the opposite side of the tongue. A pair of bolts and nuts contact the lower surface of the tongue and project through legs of the bracket through elongated slots in the bracket legs. With this arrangement, the slots permit adjustment of the bracket to surround and securely grip the sides of the trailer tongue.

U.S. Pat. No. 4,520,649 discloses a vehicle frame anchoring stand used to support a vehicle frame or other structure to be straightened in a stationary position relative to a work surface, such as concrete floor. The stand for supporting the vehicle frame includes a base plate to which is secured a post structure having a larger diameter lower tubular end portion. A smaller diameter upper end portion is slidingly and telescopically received within the upper end of the lower end portion. A horizontal mounting plate is secured to the tubular upper end portion. An angle member is anchored to the mounting plate by bolt-type fasteners that pass through bores, V-shaped slots, and the slots in the mounting plate. A clamping plate is secured by bolts to the vertical plate of the L-shaped member.

U.S. Pat. No. 2,597,634 discloses in a heat-sealing machine a height adjustable table for supporting a conveyor belt for feeding containers of thermoplastic material to the sealing apparatus. The column for supporting the sealing apparatus is raised and lowered relative to the floor by a hand-wheel.

The above discussed prior art discloses that it is known to mount frame members on vertical members or legs that are adjustable in height to raise and lower the frame members and to stabilize them on a supporting surface. It is also known to utilize brackets to mount the upper end of the adjustable height legs for supporting and receiving a frame member. While it is known to adjustably support load bearing frame members on height adjustable stands or jacks, the known devices require custom machine connections between the bracket and member on the upper end of the stand that connects to the machine frame or rails. Precut holes in the upper end of the stand or bracket and the frame to be positioned on the stand or bracket must be aligned to receive fasteners to connect the members together. This is a time consuming task.

Due to variations in the elevation of the supporting surface, it is difficult to align the holes and the members to be connected by fasteners. Therefore, there is need in a system for supporting a load bearing frame for efficiently adjusting the height of a stand upon which the frame is mounted and easily connecting the stand to the frame that allows for adjustments in the dimensions of the frame without need to precut holes in the stand and frame for alignment to receive fasteners.

SUMMARY OF THE INVENTION

In accordance with the present invention there is provided a bracket for supporting a frame that includes a base and a post having a lower end connected to the base and an upper end extending upwardly from the base. A bearing plate is secured to the post upper end. A support plate for receiving the frame extends transversely from the bearing plate. The bearing plate includes a longitudinally extending slot. The support plate includes a slot with an open end aligned with the bearing plate slot. A J-bolt has a first end received through the open end of the support plate slot for positioning therein and a second end extending through the bearing plate slot. The J-bolt second end is movable along the length of the bearing plate slot to adjust the distance between the J-bolt second end and the surface of the support plate. The J-bolt is movable in the bearing plate slot to securely engage the frame in a locked position on the support plate and in abutting relation with the bearing plate.

Further in accordance with the present invention there is provided a method for supporting a conveyor frame that includes extending a bracket from a vertical stand positioned on a foundation. The length of the stand is adjusted to position the bracket at a selected height above the foundation to receive a conveyor frame. The conveyor frame is supported by the bracket at a preselected height above the foundation. The conveyor frame is clamped to the bracket to securely support the conveyor frame on the stand above the foundation.

Additionally, the present invention is directed to a support frame that includes a vertical support mechanism and a L-shaped plate mounted on the support mechanism for receiving and supporting a frame member. A J-bolt is adjustably positioned on the L-shaped plate for movement into and out of clamping engagement with the frame member on the support mechanism. Fasteners are connected to the J-bolt and the L-shaped plate to immovably secure the J-bolt in clamping engagement with the frame member so that the frame member is secured to the vertical support mechanism.

A principal object of the present invention is to provide a stand for supporting a load bearing frame member at a preselected height where the frame member is easily connected and disconnected to the frame member to maintain the frame member in a level position.

Another object of the present invention is to provide a bracket on a stand that receives and supports a load bearing frame member where fasteners on the bracket are adjustable to accommodate frame members of different width without the need to pre-drill holes to align the frame member with the bracket or fasteners.

A further object of the present invention is to provide a bracket on a vertically adjustable stand for receiving the frame member or rails of a conveyor where the conveyor is easily clamped into engagement on the bracket by fasteners that are adjustable to accommodate frames of varying width.

An additional object of the present invention is to provide a stand for a conveyor support frame that includes a telescopic upright structure for supporting a bracket to receive a conveyor frame and support the conveyor frame above a mine floor where the bracket is height adjustable to accommodate undulations in the mine floor to maintain the conveyor frame at a preselected level height.

These and other objects of the present invention will be more completely disclosed and described in the following specification, accompanying drawings, and the appended claims.

BRIEF DESCRIPTION OF THE DRAWINGS

FIG. 3 is a front elevational view of the support stand shown in FIG. 1, illustrating the telescopic leg.

FIG. 4 is a side elevational view of the support stand shown in FIG. 3.

FIG. 5 is a top plan view of the support stand shown in FIG. 3.

DESCRIPTION OF THE PREFERRED EMBODIMENTS

Figure 10:
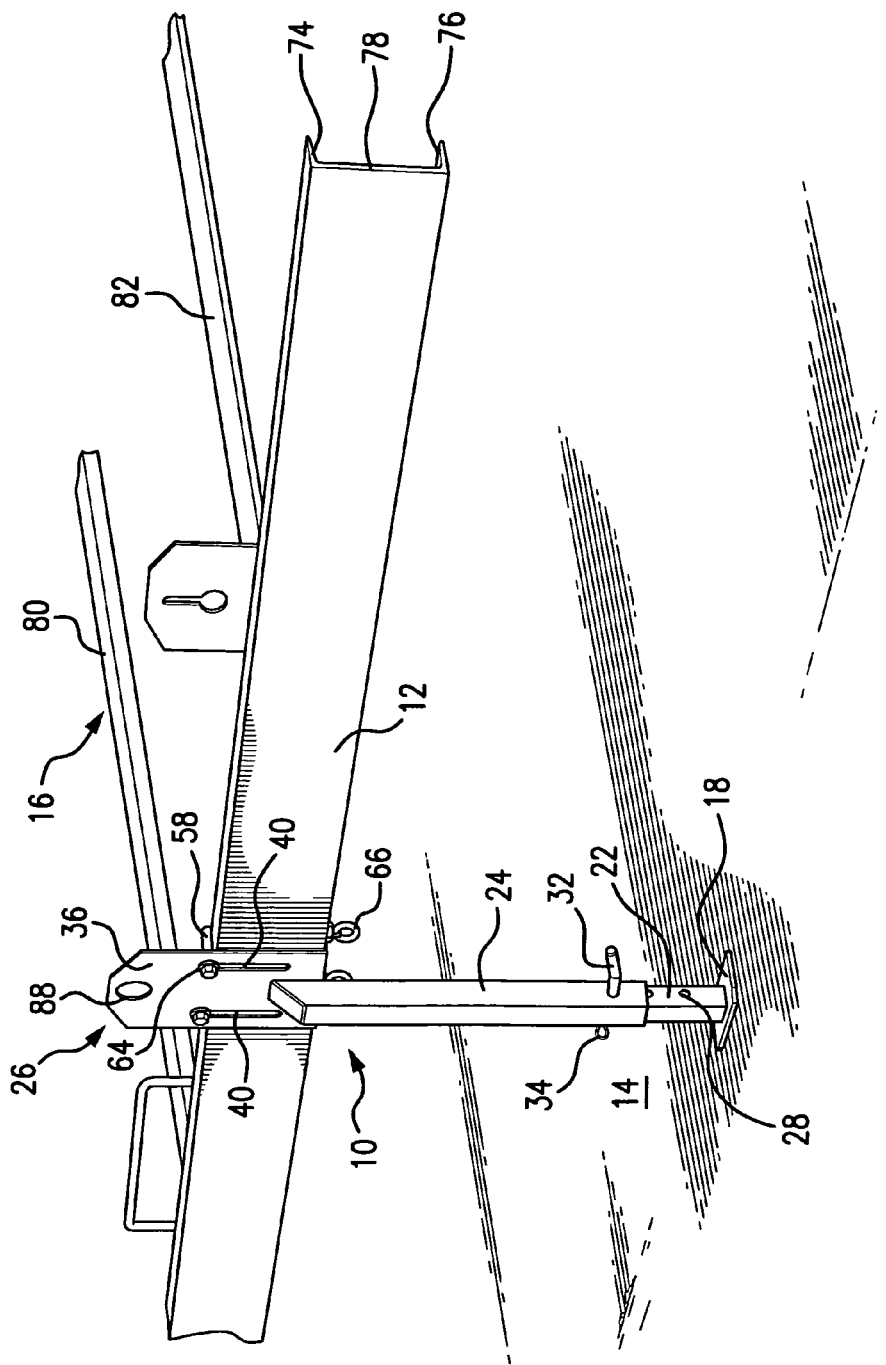
FIG. 10 is an isometric view of the support stand shown in FIG. 1 mounted on a foundation, illustrating a frame of a conveyor clamped by J-bolts to the bracket on the other end of the stand.

Referring to the drawings and particularly to FIGS. 1-5 and 10, there is illustrated a support stand or jack generally designated by the numeral 10 for supporting a structural member, such a frame or I-beam 12 as shown in FIG. 10. In FIG. 10, the I-beam 12 is part of a frame for supporting a conveyor in an elevated position above a foundation or ground 14. The support stand or jack 10 has many applications in industrial use where an elongated frame, such as an I-beam or wire rope cable must be supported in an elevated position. This occurs in applications where a conveyor support frame generally designated by the numeral 16 in FIG. 10 is supported on a foundation, such as a floor in an underground mine where the conveyor support frame supports a conventional belt-type conveyor used to transport mined material through the mine passageways from the mine face to a location where the mined material is collected and transported out of the mine. As will be explained later in greater detail, the support stand has many other applications, as for example in supporting the beams of scaffolding used in construction and when used as a jack for maintaining structural members in a preselected elevated position.

As illustrated in FIGS. 1-5 the support stand 10 includes a base plate 18 on which is mounted an upright post generally designed by the numeral 20. Preferably the post 20 includes a telescopic assembly of an inner tubular member 22 and outer tubular member 24. The inner tubular member is connected at its lower end portion to the base plate 18. The outer tubular member 24 surrounds the inner tubular member 22 and is connected at its upper end portion to an L-shaped plate or bracket 26. The upper end portion of the outer tube 24 is connected to the lower portion of the bracket 26 by conventional means such as welding, bolting, or any other suitable fastener that securely and immovably connects the bracket 26 to the outer tube 24. Extension and retraction of the outer tube 24 relative to the inner tube 22 raises and lowers the bracket 26 above the base plate 18 and foundation 14 upon which the base plate 18 is positioned.

As illustrated in FIGS. 1-4 the telescopic assembly of the inner tube 22 and outer tube 24 is in a retracted position. From this position the outer tube 24 is extended vertically on the inner tube 22 to extend the total length of the post and thereby move the bracket 26 to a desired elevation above the foundation 14. For selectively adjusting the length of the post 12, the inner tube 22 includes a plurality of through bores 28 that are spaced vertically apart the length of the inner tube 22, as shown in phantom in FIG. 4. The outer tube 24 includes a single bore 30 adjacent the lower end of the tube 24. With this arrangement the outer tube 24 is moved vertically on the inner tube 22 to align the bore 30 in outer tube 24 with a preselected one of the bores 28 in the inner tube 22.

As shown in FIGS. 1-4, the outer tube bore 30 is aligned with the lower most inner tube bore 28. To maintain the tubes 22 and 24 in this position a locking pin 32 is extended through the aligned bores 28 and 30. A cotter pin 34 engages the end of the locking pin 32 to maintain the locking pin in the selected align bores of the tubes 22 and 24.

Figure 1:
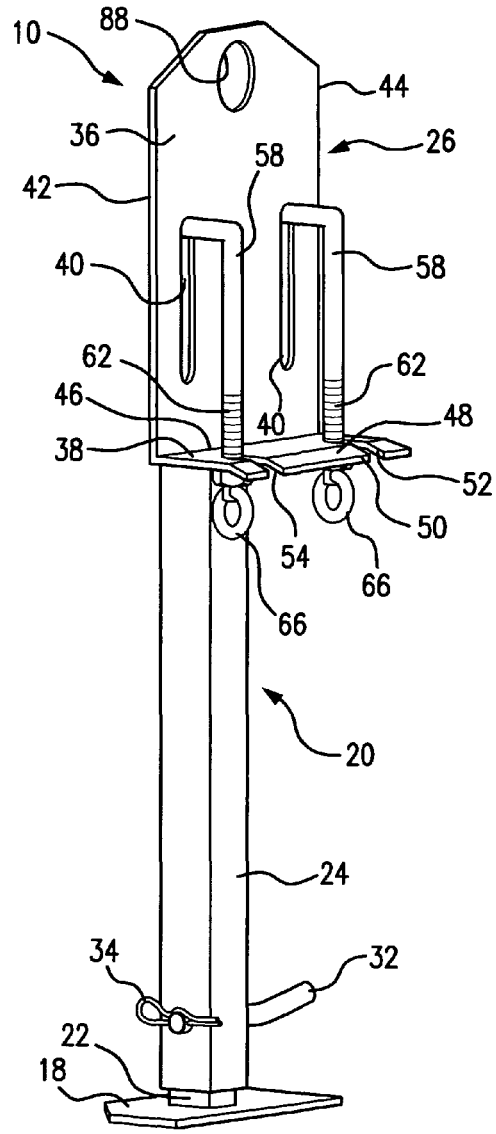
FIG. 1 is a front isometric view of a stand for supporting a load bearing frame connected to the stand, illustrating a telescoping leg for adjusting the height of the stand to receive the load bearing frame at preselected height above a foundation.
Figure 2:
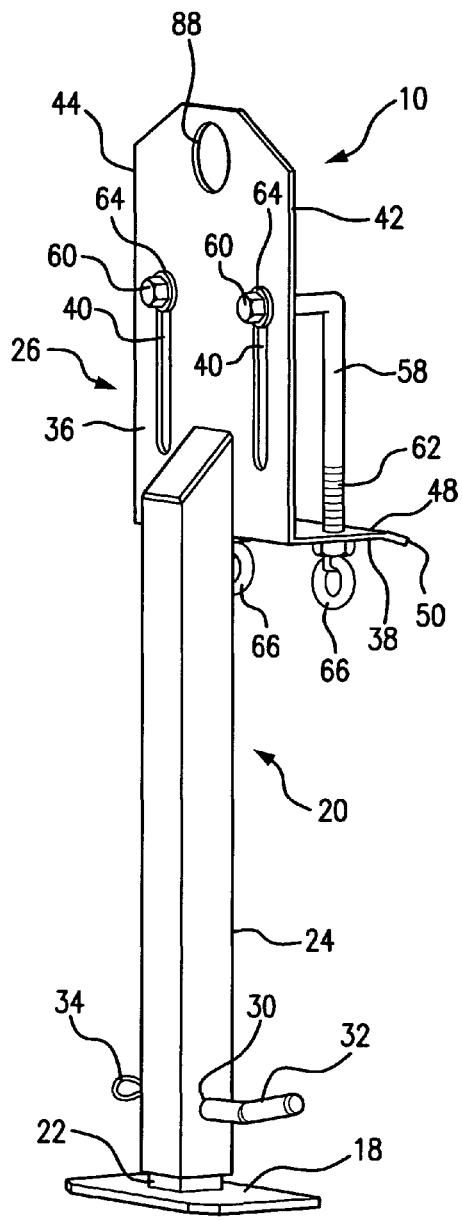
FIG. 2 is a rear isometric view of the height adjustable stand shown in FIG. 1.

To extend the length of the post 20 from the position illustrated in FIGS. 1 and 4 to raise the elevation of the bracket 26 above the foundation 14, the cotter pin 34 is removed from connection to the locking pin 32 to allow the locking pin 32 to be removed from the aligned bores shown in FIGS. 1 and 2. With the locking pin 32 removed, the outer tube 24 is raised vertically on the inner tube 22 to a selected position where the bore 30 through the outer tube 24 is aligned with one of the other vertically spaced bores 28 in the inner tube 22. In this position the locking pin is extended through the aligned bores 28 and 30, and the cotter pin 34 is engaged to the locking pin 32 to maintain the locking pin 32 in the desired position for the desired length of the post 20.

It should be understood that the post 20 has a preselected construction that includes in one embodiment the telescopic assembly of the square tubular members 22 and 24 as shown in FIGS. 1 and 4. The dimensions of the tubular members 22 and 24 are selective to accommodate the environment in which the support stand is used. The material strength of the members 22 and 24 is selected for the load that must be carried by the support stand 10. In this regard the material for constructing the members 22 and 24 is selected based on the load bearing requirements of the stand.

The configuration of the telescopic assembly of the members 22 and 24 is selective. In one embodiment of the present invention, the members are cylindrical tubes telescopically assembled where the inner tube includes a spaced vertical arrangement of through bores 28 and the outer cylinder includes the bore 30. The cylindrical tubes are fabricated from a material and of a thickness to accommodate the desired use. For use in scaffolding, the cylindrical tubes are larger in diameter than for use in supporting a conveyor frame and are fabricated from steel tubing. In a light weight application the cylinders are fabricated of synthetic material, such as plastic.

Figure 11:
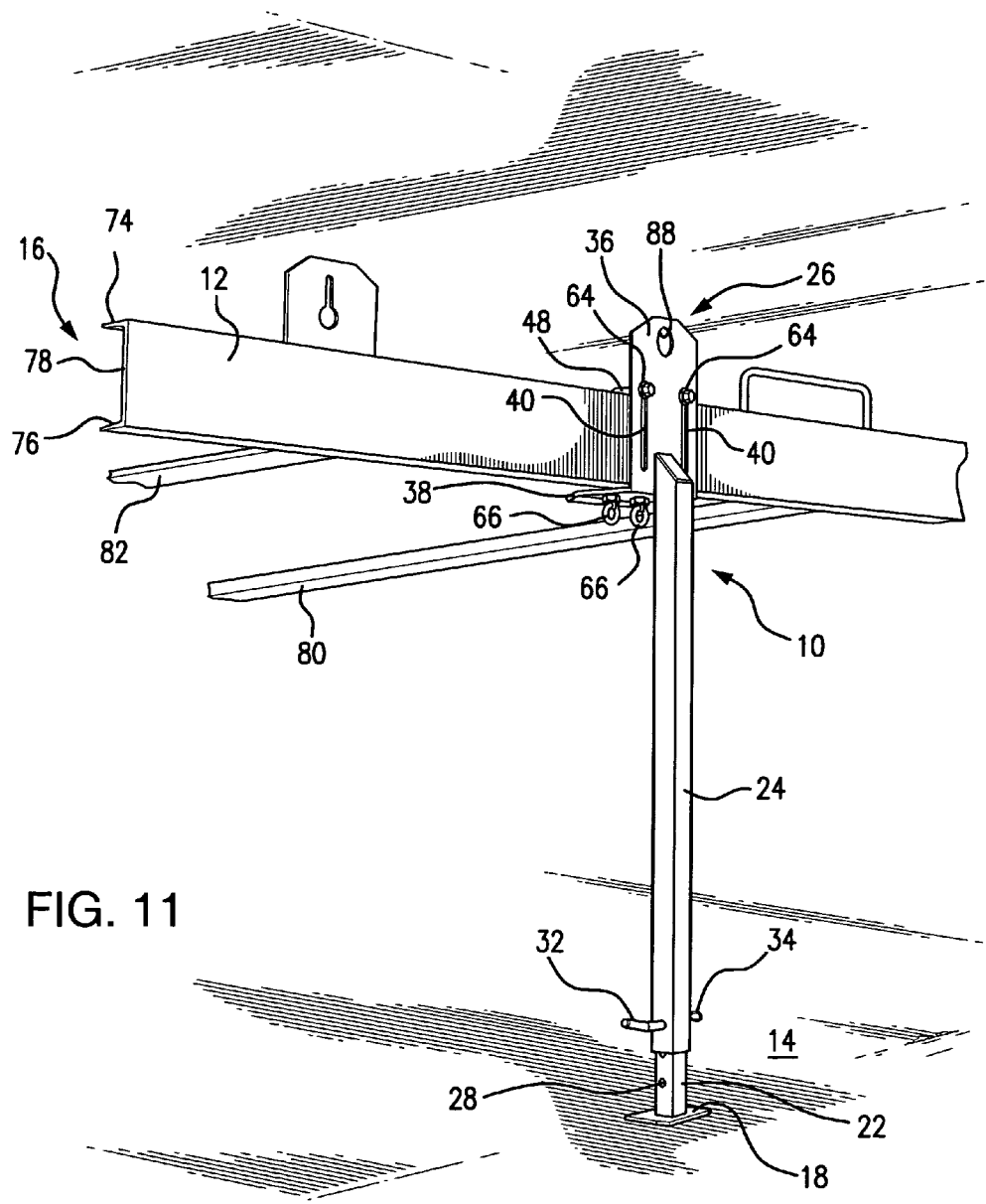
FIG. 11 is an isometric view of the support stand connected to a conveyor frame similar to FIG. 10, illustrating the stand having an extended length for supporting the conveyor frame at a desired elevation above the foundation.

With the embodiment of the support stand 10 shown in FIGS. 10 and 11 where the stand is used to support a conveyor frame 16, the telescopic arrangement of tubular members 22 and is constructed of material and having dimensions that meet the load requirements for supporting the frame 16. As shown in FIG. 10, the post 20 is of a length that extends, for example, in a range from 18 inches to 36 inches. In another application as illustrated in FIG. 10, the length of the inner and outer tubular members 22 and 24 would be selected so as to provide extension of the post to a height of up to 6 feet for supporting the conveyor frame 16.

As shown in detail in FIGS. 3-8, the L-shaped plate or bracket 26 includes a vertically extending bearing plate 36 that is connected, preferably by welding, to the upper end of the outer tubular member 24. A support plate 38 is formed integrally with the bearing plate 36 to extend transversely in a horizontal position from the lower end of the bearing plate 36. In one fabricating method, the L-shaped plate 26 is formed by bending a plate into the configuration shown in FIGS. 6-8. Also the bearing plate 36 and support plate 38 are fabricated by connecting the members by welding or with fasteners in a conventional manner.

The bracket 26 formed by the bearing plate 36 and support plate 38 has a selected dimension to meet the load bearing requirements of the frame to be supported. Consequently, the dimensions of the bracket 26 including the length and thickness of the respective plates 36 and 38 is selective. With the bracket 26 illustrated in FIGS. 6-8, the bearing plate 36 and support plate 38 have a preselected width to accommodate a pair of laterally spaced longitudinal slots 40 extending vertically on the bearing plate 36. Preferably, the slots 40 are positioned adjacent lateral edges 42 and 44 of the plate 36.

The support plate 38 extends transversely on the bearing plate 36 in a substantial horizontal position at lower edge 46 of the plate 36. Because the support plate 38 is formed integral with the bearing plate 36, the support plate 38 is in a horizontal position when the plate 36 is positioned with the lateral edges 42 and 44 in a vertical position.

The support plate 38 extends a preselected distance from the lower edge 46 of the bearing plate 36 to a free edge portion 48. In the embodiment of the bracket 26 shown in FIGS. 6-8, the plate free edge portion 48 includes a downturned lip 50. The lip 50 serves to reinforce or strengthen the plate 38 to withstand the load applied by the frame supported by the plate 38. The plate 38 includes a pair of slots 52 spaced a preselected distance apart. Each slot 52 includes an open end portion 54 and a closed end portion 56 spaced from the lower edge 46 of the plate 36.

Figure 6:
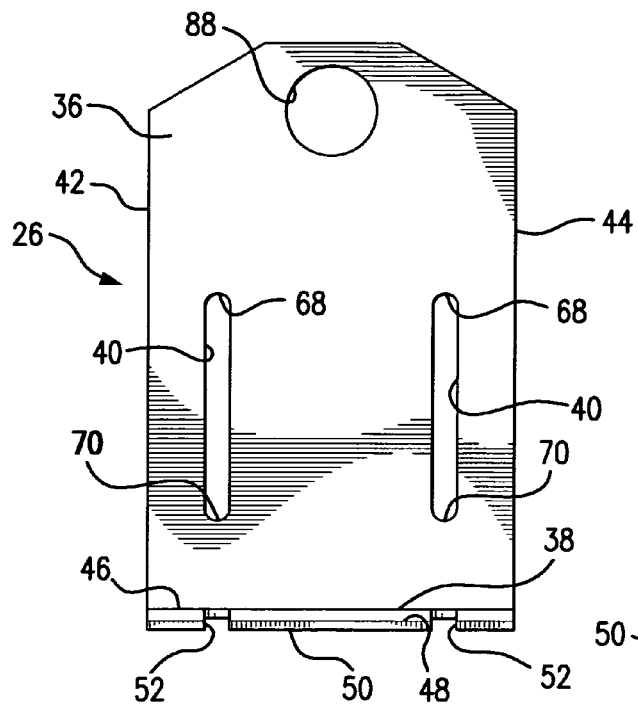
FIG. 6 is an elevational view of a L-shaped bracket that is mounted on the upper end of the telescopic leg of the support stand shown in FIG. 1.
Figure 8:
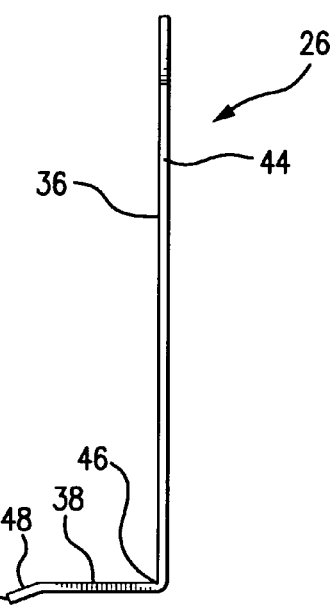
FIG. 8 is a view in side elevation of the bracket shown in FIG. 6.
Figure 7:
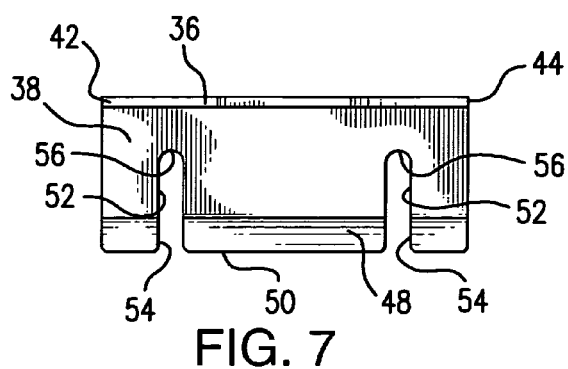
FIG. 7 is a top plane view of the bracket shown in FIG. 6.

The slots 52 in the support plate 38 are positioned in spaced parallel relation in alignment with the slots 40 that extend vertically in the bearing plate 36 above the support plate 38. With this arrangement the slots 40 extend vertically on the plate 36, and the slots 52 extend horizontally on the support plate 38 when the bracket 26 is positioned as illustrated in FIGS. 6 and 8 corresponding to the position of the bracket 26 mounted on the post 20 as shown in FIGS. 1-4. The spacing between the slots 40 on plate 36 are the same as the spacing between the slots 52 on the support plate 38. With this arrangement the pairs of slots 40 are aligned with the pairs of slots 52.

The alignment of the slots 40 in the bearing plate 36 with the slots 52 in the support plate 38 permit the positioning of J-bolts or cap screws 58 in the pair of slots 40 and 52 as shown in FIGS. 1-5. Each J-bolt 58 includes an integral cap at one end and an externally threaded portion 62 at the opposite end. A pair of J-bolts 58 are positioned in the aligned pair of slots 40 and 52. The J-bolt extends through the bearing plate slot 40 so that the cap 60 bears against the plate on the back face of the plate 36 above the post 20. Preferably, a washer 64 is positioned on the bolt 58 between the cap 60 and the back face of the plate 36 to support the cap 60 around the slot 40, as shown in FIGS. 2 and 4.

The J-bolt 58 has a right angle configuration to allow the cap end of the bolt to extend through the slot 40 in the bearing plate 36 and the threaded end portion 62 to extend through the slot 52 in the support plate 38. The bolt threaded end portion 62 extends below the plate 38 in the slot 52 to receive a bell nut 66. The bell nut 66 is tightened on the bolt threaded end portion 62 to draw the cap 60 of the bolt 58 into abutting relation with the bearing plate 36.

Figure 9:
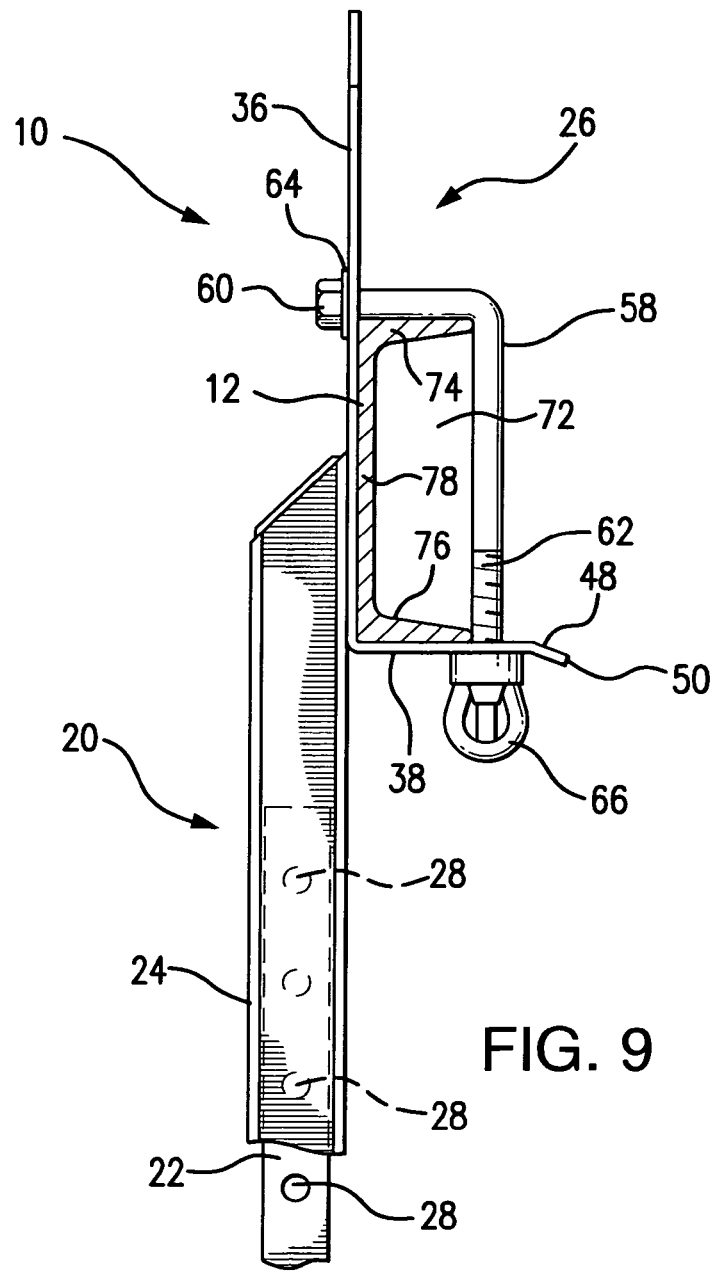
FIG. 9 is a fragmentary sectional view in side elevation of the upper end of the support stand, illustrating a frame member clamped into position on the L-shaped bracket by a J-bolt having its ends secured to the bracket.

Prior to tightening the bell nut 66 on the bolt threaded end portion 62, the cap end of the bolt 58 is vertically movable in the slot 40 between closed ends 68 and 70 of the slot 40. Because the slot 40 in the plate 36 is aligned with the corresponding slot 52 in the plate 38, the cap end of the bolt 58 is movable vertically in the slot 40 toward and away from the support plate 38. Thus the position of the cap end of the bolt 58 is adjustable in the slot 40. Once the cap 60 of the bolt 58 is in the desired position between the closed ends 68 and 70 of the slot 40, the bell nut 66 is tightened on the bolt threaded end portion 62 into abutting relating with the bottom surface of the plate 38, as shown in FIGS. 3 and 4. As shown in FIG. 4, an enclosed space 72 is formed when the cap 60 of bolt 58 abuts the plate 36 and the bell nut 66 is threaded on the bolt end 62 into abatement with the plate 38. Preferably, the enclosed space 72 has a cross-sectional area for receiving the frame 12 or I-beam as shown in FIG. 9.

In the embodiment of the support stand 10 shown in FIGS. 1-8, the bracket 26 is provided with a pair of slots 40 in the plate 36 aligned with a pair of slots 52 in the plate 38. The present invention also includes an embodiment (not shown) of the bracket 26 having a single slot 40 in the bearing plate 36 aligned with a single slot 52 in support plate 38. With this single slot arrangement, the slot 40 extends vertically on the plate 36 preferably centered between the lateral edges 42 and 44 of the plate 36. The single slot 52 in the plate 38 extends from an open end 54 to a closed end portion 56 centered between the lateral edges of the plate 38. The single slot 52 in plate 38 is aligned with the single slot 40 in plate 36. Thus in the same manner as above described for the pairs of slots 40 and 52, the J-bolt 58 is positioned so that the cap end of bolt 58 is positioned in the single slot 40 and the bolt threaded end portion 62 extends through the single slot 52. Once the cap end of the bolt 58 is located in the desired position in the slot 40, the bell nut 66 is tightened on the bolt threaded end portion 62. This arrangement forms the enclosed space 72, as shown in FIG. 4.

The determination of the number of aligned slots that are formed in the plates 36 and 38 of the bracket 26 is determined in part by the width of the plates 36 and 38. This factor is dependent upon the size and weight of the frame 12 to be supported by the bracket 26 on the post 20. For a relatively lightweight frame 12, the single slot arrangement for the bracket 26 is appropriate. For a heavier frame 12, the pairs of slots in the bracket 26, as shown in FIGS. 1-8 is appropriate. It should also be understood for a multi-slotted bracket 26, an embodiment is provided having the close-ended slots 40 positioned in the support plate 38 and the open-ended slots 52 in the bearing plate 36 to receive and secure the J-blots 58 to bracket 26.

In the embodiment of the present invention for a larger bracket 26 where there is a need to support a heavier and wider frame 12, the bracket 26 includes three or more spaced apart and vertically extending slots 40 in the plate 36 aligned with three or more horizontally spaced apart slots in plate 38. Each of the respective pairs of slots 40 and 52 for a multi-slotted bracket 26 receives for connection the J-bolt 58, in the same manner described above. Accordingly, based upon the load supporting requirements for the support stand 10, the size of the bracket 26 is selected to accommodate the number of aligned slots 40 and 52 in the plates 36 and 38 required to support the frame 12 or I-beam, as shown in FIG. 9. Also, the positioning of slots 40 in plate 38 and slots 52 in plate 3E is selective.

FIG. 9 illustrates an I-beam 12 of a conveyor support frame 16, shown in FIG. 10, locked in position on the support plate 38 of bracket 26 by abutment with the bearing plate 36 and the J-bolt 58 clamped to the bracket 26. The J-bolt 58 is positioned in the respective slots 40 and 52 so that the cap end of the bolt 58 engages a top flange 74 of I-beam 12 with a bottom flange 76 of I-beam 12 supported by the plate 38. The bell nut 66 is advanced on the bolt threaded end portion 62 until the cap end of the bolt 58 is clamped into engagement with the I-beam flange 74 as shown in FIG. 9. With this arrangement, a web portion 78 of I-beam 12 abuts or bears against the bearing plate 36. In this manner, the I-beam 12 is locked in position on the support plate 38 by abutment with the J-bolt 58 and the bearing plate 36 at a preselected height above the base 18 on foundation 14.

As illustrated in FIG. 9, the post 20 is extended by the provision of the telescopic arrangement of the inner tubular member 22 and the outer tubular member 24 to position the bracket 26 at a preselected height to support the I-beam 12 in a stationary position. For the position of the I-beam 12 relative to the foundation 14, the length of the post is adjusted so that the lower flange 76 of the I-beam 12 rests on the support plate 38 of the bracket 26.

With the I-beam 12 positioned oppositely the bracket 26, the length of the post 20 is adjusted so that the support plate 38 engages the I-beam 12. Thereafter, the post 20 is moved so that the bearing plate 36 of the bracket 26 abuts against the web portion 78 of the I-beam 12. Once the post 20 is positioned below the I-beam 12 so that the I-beam flange 76 rests on the bracket support plate 38 and the I-beam web 78 abuts against the bracket bearing plate 36, the J-bolt is extended through the respective slots 40 and 52.

Initially, the J-bolt threaded end portion 62 is extended through the bearing plate slot 40 from the back face of the plate 36 so that the threaded end portion 62 passes downwardly through the open end 54 of the slot 52 in the support plate 38. With the bolt threaded end portion 62 extending through the slot 52, and the bolt 58 bearing against the I-beam 74, as shown in FIG. 9, the bell nut 66 is advanced on the bolt threaded end portion 62. The nut 66 is drawn into abutting relation with the lower surface of the support plate 38 and tightened on the bolt threaded end portion 62. Tightening the nut 66 on the bolt 58 securely clamps the bolt 58 to the beam upper flange 74, the bearing plate 36 to the beam web portion 78, and the support plate 38 to the beam lower flange 78.

When the J-bolt 58 is connected to the bracket 26 and the I-beam 12, the I-beam is securely locked in position on the support stand 12. Each J-bolt 58 that is utilized to clamp the I-beam 12 to the bracket 26 on the post 12, regardless of the number of aligned slots provided on the plates 36 and 38, is connected in the above described manner to the bracket 26. This is demonstrated by the embodiment of the support stand illustrated in FIGS. 1-5 where a pair of J-bolts are mounted on the bracket 26. This also applies to the embodiments, as above described, utilizing a single J-bolt connected to the bracket 26 and three or more J-bolts connected to the bracket 26 and with the close-ended slots 40 in support plate 38 and the open-ended slots 52 in the bearing plate 36.

With each embodiment of the present invention, the J-bolt 58 is adjusted on the bracket 26 for movement of the bolt cap 60 vertically opposite the slot 40. With the slot 40 having an elongated length, the J-bolt has a wide range of movement in the slot 40. The adjustability of the position of the J-bolt 58 in the slot 40 provides the stand 10 with the versatility to be connected to frames of a wide range of size. In this regard, the length of the slot 40 in the bracket 26 is selected to provide the stand with a degree of versatility for a number of different frame supporting applications.

Figure 12:
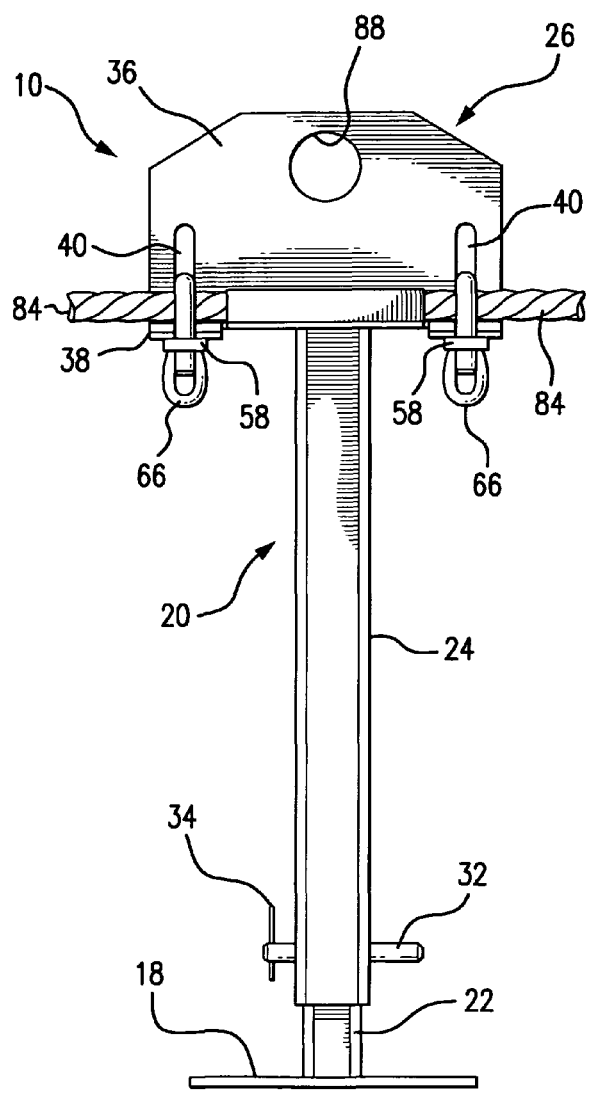
FIG. 12 is a view similar to FIG. 3, illustrating an embodiment of the support stand for supporting a wire rope conveyor frame.
Figure 13:
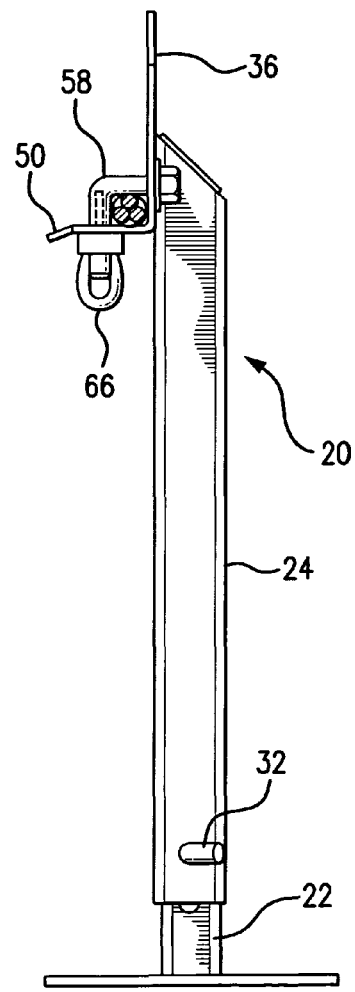
FIG. 13 is a view in side elevation of the support frame shown in FIG. 12.

In one application of the present invention, a conveyor support frame 16 of a continuous conveyor is illustrated in FIG. 10 in an underground mine. It should be understood that any conveyor frame supported by a stand or jack on a foundation is relevant to the present invention. This applies to a conveyor frame fabricated of I-beams as shown in FIGS. 10 and 11 or wire rope cable as shown in FIGS. 12 and 13. The conveyor frame 16 is maintained at a preselected elevation above the mine floor 14 by the stand 10. The conveyor support frame 16 is conventional in design and includes a number of structural frame members including the I-beam 12 and cross beams 80 and 82 connected thereto for supporting a continuous conveyor (not shown).

An example conveyor applicable to the present invention is a belt-type conveyor having upper and lower surfaces. One end of the conveyor is driven to advance the conveyor belt from a point in the mine where the mined material is loaded onto the conveyor to a location in the mine where the mined material is transferred from the conveyor to other haulage devices for movement out of the mine.

It is the conventional practice in underground mining operations to support the conveyor frame 16 by brackets that are cut to a preselected length determined by the height the conveyor frame is to be supported above the mine floor. Holes are cut in the upper end of the bracket or leg to receive bolts aligned with holes cut in the conveyor frame. This is a time consuming operation, and the cutting of bolt holes in the conveyor frame weakens the frame. In many installations the brackets are not cut to the correct length to maintain the conveyor frame in the desired level position, so the brackets must be shimmed to raise the conveyor frame.

With the support stand 10 of the present invention, the adjustable length of the bracket 26 permits the bracket to be raised to the desired position to receive the I-beam 12. By the provision of the J-bolts movable in the elongated and aligned slots 40 and 52, the frame is moved to a final position on the bracket without the need to cut bolt holes in the conveyor frame. The support stand 10 also overcomes the problems encountered with conventional conveyor supports of the conveyor running off track and damaging the supports. This is a particular problem when timbering is used to support a conveyor frame. The timbers extend inside the conveyor frame and expose the frame to damage by the advancing conveyor belt.

To install the support stand 10 for clamping to the conveyor frame 16 in an underground mine, as shown in FIG. 10, the post 20 is initially positioned adjacent the I-beam 12 for locating the base plate 18 on the mine floor 14 immediately below the lower flange 76 of the I-beam 12. The cotter pin 34 is removed from engagement with the locking pin 32 so that the locking pin can be removed from the aligned bores in the inner and outer tubular members 22 and 24. The outer tubular member is then free to extend on the inner tubular member 22 to advance the bracket 26 vertically to position the support plate in engagement with the I-beam lower flange 76. After the outer tubular member 24 is advanced on the inner tubular member 22 to position the support plate 38 to receive the I-beam 12, the relative position of the outer tubular member 24 to the inner tubular member 22 is secured by extending the locking pin 32 through the selected aligned holes in tubular members 22 and 24. In this manner, the support plate 36 is positioned to receive the I-beam 12. In this position, the locking pin 32 is secured in place by the cotter pin 34.

Once the post 20 is elevated to position the I-beam 12 on the support plate 38 and the relative position of the inner tubular member 22 and the outer tubular member 24 are locked in place, the J-bolt 58 is then installed to complete clamping of the I-beam 12 to the bracket 26. As above described, the threaded end portion 62 of the bolt 58 is advanced through the elongated vertical slot 40 in plate 36 to move the cap 60 into engagement with a washer 64 retained on the J-bolt 58 opposite the slot 40. The bolt threaded end portion 62 is then extended through the open ended slot 52 in the plate 38. In this position the J-bolt 58 is then moved downwardly in the slot 40 until the cap end of the bolt 48 is in abutting contact with the I-beam upper flange 74, as shown in FIG. 9. The bell nut 66 is tightened on the bolt threaded end portion 62. This draws the bolt 58 into clamping engagement with the I-beam 12 where it is in contact with the surfaces of the bearing plate 36 and support plate 38 of the bracket 26.

The operation of adjusting the position of the bolt in the elongated slot 40 to securely clamp the frame 12 to the bracket 26 is quickly and efficiently carried out. The method of the present invention overcomes the problems encountered with the known methods of supporting a conveyor frame by cutting support legs to a preselected length and then drilling bolt holes in the leg and frame to complete a bolted connection of the support leg to the frame. Furthermore, in the event a section of the supported conveyor frame becomes displaced from a level position, the height of the stand 10 is adjusted by the telescopic post 20 to return the conveyor frame to a level position.

With the support stand 10 of the present invention, the conveyor support frame 16 is initially installed for supporting a conveyor by positioning and mounting the frame 12 on the support stand 10, as above described. The support stand is also adaptable to be installed to replace an existing support device for the conveyor support frame 16. For example, in one application the support stand 12 is used to replace a broken support leg that is connected to the frame 12, a timber support for supporting the frame, or a hanger used to connect the conveyor frame to brackets that are anchored to a mine roof above the conveyor. To replace each of these conventional support devices, the support stand 12 is positioned on the floor/foundation 14 adjacent the I-beam 12. The telescopic post 20 is height adjusted, as above described, to extend the bracket 26 to a position where the bracket support plate 38 abuts the I-beam lower flange 76. This movement permits the I-beam 12 to rest on the bracket support plate 38.

With the post 20 extended to the desired height, the bracket 26 is slid into position to receive the I-beam 12 on the plate 36. The post 20 is adjusted so that it extends vertically from the base plate 18 adjacent the I-beam 12. After the I-beam 12 is positioned on the bracket support plate 38, the J-bolt 58 is extended into position through the aligned slots 40 and 52. The position of the J-bolt 58 is adjusted on the bracket 26 by moving the J-bolt 58 along the length of the slot 40 until the cap end of the J-bolt 58 abuts the I-beam upper flange 74, as shown in FIG. 9. In this position, the bell nut 66 is then tightened on the threaded end portion 62 of the bolt 58 below the support plate 38. This draws the bolt cap 60 and washer 64 into secure abutting relation with the surface of the bracket bearing plate 36.

Based on the size of the frame I-beam 12 supported by the stand 10, the embodiment of the stand 10 is selected to include the number of J-bolts 58 needed to securely connect the I-beam 12 to the bracket 26. As above discussed, in certain applications a bracket 26 with the single bolt arrangement is sufficient to secure the frame 12 in position. In other applications, the two-bolt embodiment and the three-bolt or more embodiment is used. In the application shown in FIG. 10, the two-bolt embodiment of the support stand 10 is utilized to secure the I-beam 12 to the stand 10.

The post 20 for connection to the bracket 26 is preferably formed of the telescopic members which in one embodiment are square tubes. In another embodiment the telescopic members are cylindrical members. In both embodiments, the length of the telescoping members is determined by the structural demands of the support application of the stand 10. In one application the post is selected for a range of length from 18 inches to 36 inches. In another application, the post is constructed to support a frame or beam that is elevated six or more feet above a foundation.

FIG. 11 illustrates an embodiment of the stand 10 used to support a conveyor support frame 16 at an elevation above the floor 14 greater than the elevation supported by the conveyor support frame 16 shown in FIG. 10. In this regard, the support stand 10 has many applications where the need is to support an elongated frame member at preselected height above a foundation. In another application, the stand 10 is used in place of timbers in an underground mine to support a conveyor frame at a height of six feet or more above the mine floor.

FIGS. 12 and 13 illustrate a further embodiment of the stand 10 used to support a conveyor support frame that is formed by wire rope cable and is known in the art as a rope conveyor used to support a belt conveyor in an underground mine, as above described. The rope conveyor is formed by wire rope 84 of a preselected diameter, for example 1-inch cable. Parallel lengths of cable 84 serve the same function as the I-beams 12 to form a frame for supporting the rollers on which the upper and lower surfaces of the conveyor belt run.

The support stand 10 shown in FIGS. 12 and 13 includes like elements identified by like numerals shown in FIGS. 1-5. A section of wire rope cable 84 is positioned on the support plate 38 in abutting relation with the bearing plate 36. In the manner above described, the J-bolt 58 is tightened on the bracket 26 so that the cap end of the bolt 58 engages the top of the cable 84 with the bottom of the cable 84 supported by the plate 38. Also, the bracket 26 is provided with a hole 88 to receive a hanger (not shown) anchored to the mine roof. This hole is also illustrated in FIGS. 1-3, 6, 10 and 11.

While the support stands 10 shown in FIGS. 10 and 11 are secured to a conveyor frame to support a conveyor, the stand 10 is also used as a jack to temporarily hold the position of an elongated frame member until a more permanent support device is installed. The combination of the bracket 26 and adjustable length post 20 is also applicable in the construction of scaffolding in building construction. Thus, the support stand 10 has wide application of use to efficiently secure in position a structure at a preselected height above a foundation.

According to the provisions of the patent statutes, we have explained the principal, preferred construction, and mode of operation of our invention and have illustrated and described what we now consider to represent its best embodiments. However, it should be understood that within the scope of the appended claims, the invention may be practiced otherwise than as specifically illustrated and described.

We claim:

1. A bracket for supporting a frame comprising,
   a base,
   a post including a lower end connected to said base and an upper end extending upwardly from said base,
   a bearing plate secured to said post upper end,
   a support plate extending transversely from said bearing plate to receive the frame,
   said bearing plate including a longitudinally extending slot,
   said support plate including a slot with an open end aligned with said bearing plate slot,
   a J-bolt having a first end received through said open end of said support plate slot for positioning therein and a second end extending through said bearing plate slot,
   said J-bolt second end movable along the length of said bearing plate slot to adjust the distance between the J-bolt second end and the surface of said support plate, and
   said J-bolt movable in said bearing plate slot to securely engage the frame in a locked position on said support plate and in abutting relation with said bearing plate.

2. A bracket for supporting a frame as set forth in claim 1 which includes,
   said post being extensible in length between said base and said bracket to position said bracket at a preselected height above said base.

3. A bracket for supporting a frame as set forth in claim 1 which includes,
   said post being telescopic in length to adjust the distance between said bracket and said base.

4. A bracket for supporting a frame as set forth in claim 1 which includes,
   said post being constructed of a telescopic assembly of an inner tube and an outer tube,
   said inner and outer tubes being movable relative to one another to extend and retract said telescopic assembly,
   said inner and outer tubes having through bores for alignment with one another, and
   a pin extending through selected aligned through bores of said inner and outer tubes for maintaining a preselected length of said post between said base and said bracket.

5. A bracket for supporting a frame as set forth in claim 1 which includes,
   a nut engaging threads on said J-bolt first end to move into contact with said support plate to retain said J-bolt in a fixed position in said support plate slot,
   an enlarged portion on said J-bolt second end to move into contact with said bearing plate to retain said bearing plate in a fixed position in said bearing plate slot, and
   said J-bolt secured to said support plate and said bearing plate so that the frame is locked in position on the support plate by abutment with said J-bolt and said bearing plate.

6. A bracket for supporting a frame as set forth in claim 1 which includes,
   said bearing plate and said support plate being integrally formed in a L-shaped configuration, and
   said bearing plate extending vertically from said support plate in a horizontal orientation to permit positioning of the frame on said support plate in abutting relation with said bearing plate.

7. A bracket for supporting a frame as set forth in claim 6 which includes,
   said J-bolt retained in said slots of said bearing plate and said support plate to engage the frame in a clamped position on said support plate by abutting engagement of the frame with said support plate, said bearing plate, and said J-bolt.

8. A bracket for supporting a frame as set forth in claim 1 which includes,
   said J-bolt first and second ends movable vertically in said slots of said bearing plate and said support plate to a preselected position where said J-bolt, said bearing plate, and support plate surround the frame in clamping engagement to prevent movement of the frame on said support plate.

9. A bracket for supporting a frame as set forth in claim 1 which includes,
   said post constructed of a telescopic assembly of tubes including outer and inner tubes,
   said outer tube connected in abutting relation to one surface of said bearing plate,
   said support plate connected to and extending transversely from an opposite surface of said bearing plate, and
   said outer tube movable vertically relative to said inner tube to adjust the vertical height of said support plate to support the frame at a selected height above said base.

10. A bracket for supporting a frame as set forth in claim 1 which includes,
    said J-bolt first end having a threaded portion,
    said J-bolt second end having a cap, and
    a nut engagable with said threaded portion of said J-bolt first end to advance in abutting relation with said support plate to urge said cap on said J-bolt second end into abutting relation with said bearing plate and thereby retain said J-bolt in a fixed position in said slots in said bearing plate and said support plate.

* * * * *